2,894,965

OCTANOIC ACID ESTERS AND METHOD OF PREPARING THE SAME

Milon W. Bullock, Pearl River, N.Y., assignor to American Cyanamid Company, New York, N.Y., a corporation of Maine No Drawing. Application July 22, 1957
Serial No. 673,165

6 Claims. (Cl. 260—408)

This invention relates to new organic compounds. More particularly, it relates to 8-chloro-6-oxooctanoic acid esters and a method of preparing the same.

In my copending application, Serial No. 284,205, filed April 24, 1952, I described the preparation of omega-[3-(1,2-dithiolanyl)] aliphatic acids, salts, and esters thereof. These compounds are described as oxidation inhibitors and growth supporting factors for certain microorganisms including *S. facelis, Tetrahymena geleii*, and some Corynebacterium species. Also disclosed in said application is the use of 8-chloro-6-oxooctanoic acid esters as intermediates in the preparation of new active compounds. The present application is a continuation-in-part of application Serial No. 284,205, filed April 24, 1952, now U.S. Patent No. 2,872,455, and also of application Serial No. 387,024, filed October 19, 1953, now United States Patent No. 2,806,047, and describes and claims the said intermediates.

The new compounds of the present invention may be illustrated by the following general formula:

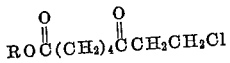

in which R is a lower alkyl radical.

The compounds of the present invention are, in general, liquids at room temperature. They are immiscible with water and soluble or miscible with the usual organic solvents, such as acetone, chloroform, ether, and the like.

To prepare the compounds of the present invention, it is preferred that ester acid halides, such as a lower alkyl adipyl chloride, be reacted with ethylene in the presence of a catalyst. The preferred catalyst is anhydrous aluminum chloride, although other condensation catalysts can be used.

The reaction to prepare the compounds of the present invention may be illustrated as follows:

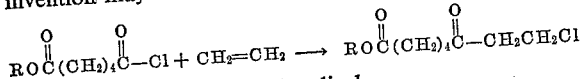

in which R is a lower alkyl radical.

The reaction can be carried out by bubbling ethylene through a solution of at least two moles of anhydrous aluminum chloride for each mole of adipyl chloride ester at a temperature of from 10° to 75° C. until no more ethylene is absorbed. The reaction can also be carried out by adding the adipyl chloride ester to a solution or suspension of the catalyst in an appropriate solvent, such as ethylene chloride, methylene chloride, nitrobenzene, ethyl bromide, or carbon disulfide, through which a stream of ethylene gas is being passed.

When the reaction is complete, the product is obtained by pouring the reaction mixture into crushed ice and an organic solvent, such as ethyl acetate, and separating the organic solvent layer. Removal of the solvent gives the 8-chloro-6-oxooctanoic acid ester.

The following examples illustrate in greater particularity the preparation of the compounds of the present invention.

Example 1

Ethylene gas was passed into a stirred solution of 35.4 g. (0.273 mole) of anhydrous ammonium chloride in 26.3 g. (0.136 mole) of ethyl adipyl chloride. The solution became slightly warm, and some HCl evolved. After six hours, the mass solidified. The contents of the reaction flask were stirred into a mixture of ice and water, and the product was extracted with chloroform. The chloroform solution was washed with half saturated sodium bicarbonate solution and dried over sodium sulfate. The solvent was distilled off and the product obtained was ethyl-8-chloro-6-oxooctanoate.

The above product was characterized by dehydrohalogenation and distilling under reduced pressure at 116°–118° C. and 1.5 mm. to yield 8.0 g. (0.043 mole), 32%, of ethyl $\Delta^{7}$,6-oxooctenoate.

Example 2

In a 2-liter, three-neck flask equipped with a fast and efficient stirrer, condenser, thermometer, and dropping funnel were placed 572 g. (4.27 moles) of anhydrous, granular, aluminum chloride and 800 ml. of ethylene chloride. The reaction flask was cooled in an ice bath while 382 g. (2.14 moles) of methyl adipyl chloride was added from the dropping funnel at such a rate that the temperature remained between 35°–40° C. The dropping funnel was replaced by a gas inlet tube of the sintered glass type, and ethylene was passed into the rapidly stirred solution. Absorption of the olefin was rapid. The temperature was maintained at 40°–45° C. by cooling with an ice bath. After one hour the absorption of ethylene was complete. The contents of the reaction flask were stirred into a mixture of a liter of ethyl acetate and ice, to which approximately .5 g. of hydroquinone had been added as a stabilizer. The organic layer was separated and washed once with water and once with two liters of ice cold (N) sodium hydroxide.

The methyl 8-chloro-6-oxooctanoate solution obtained above was then dried over magnesium sulfate and then stirred at reflux temperature for three hours with 352 g. (4.27 moles) of anhydrous sodium acetate. The reaction mixture was extracted twice with two liter volumes of ice water and dried over sodium sulfate. The solvent was removed by distillation and the conversion product, methyl $\Delta^{7}$-6-oxooctenoate, was obtained, and it distilled at 97°–99° C. at 0.35 mm. and had $N_D^{20}$ 1.4519 and $d^{20}$ 1.016. The yield was 255.5 g. (1.5 moles), 70%.

Example 3

In a 3-liter, three-neck flask equipped with stirrer, dropping funnel, and gas outlet were placed 700 ml. of nitrobenzene. The reaction flask was cooled in an ice bath and 500 g. (3.78 moles) of powdered anhydrous aluminum chloride was added in portions over a period of five minutes. Now 360 g. (1.87 moles) of ethyl adipyl chloride was added from the dropping funnel over a period of fifteen minutes. The dropping funnel was replaced by a gas inlet tube of the sintered glass type, and ethylene gas was bubbled through the rapidly stirred solution for four and one-half hours. The temperature of the reaction mixture was maintained at 45°±3° during the first three hours and then allowed to cool. The reaction mixture was stirred into a mixture of ice and chloroform containing a small amount of hydroquinone as a stabilizer. The organic layer was separated, washed with water, dilute sodium hydroxide, and again with water. The organic layer was dried over sodium sulfate and the chloroform removed by distillation on the steam cone. The product obtained was ethyl 8-chloro-6-oxooctanoate.

The above product was dehydrohalogenated during distillation under reduced pressure and finally redistilled through a twenty-four inch heated Vigreux column, using an oil bath to supply the heat. After a small forerun, the conversion product distilled at 110°–115° C. at 2–3 mm. The yield was 165.5 g. (0.905 mole), 48%. The pure ethyl $\Delta^{7,6}$-oxooctenoate had $N_D^{25}$ 1.4481, $N_D^{20}$ 1.4500.

I claim:

1. Compounds having the general formula:

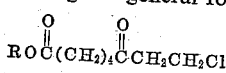

in which R is a lower alkyl radical.

2. The compound methyl 8-chloro-6-oxooctanoate.
3. The compound ethyl 8-chloro-6-oxooctanoate.
4. A method of preparing a lower alkyl ester of 8-chloro-6-oxooctanoic acid which comprises reacting a lower alkyl adipyl chloride with ethylene in the presence of at least 2 moles of aluminum chloride for each mole of acid chloride.
5. A method of preparing methyl 8-chloro-6-oxooctanoate which comprises reacting methyl adipyl chloride with ethylene in the presence of at least 2 moles of aluminum chloride for each mole of acid chloride.
6. A method of preparing ethyl 8-chloro-6-oxooctanoate which comprises reacting ethyl adipyl chloride with ethylene in the presence of at least 2 moles of aluminum chloride for each mole of acid chloride.

References Cited in the file of this patent

UNITED STATES PATENTS 2,792,406    Acker _____ May 14, 1957

FOREIGN PATENTS 519,333    Belgium _____ Oct. 23, 1953

OTHER REFERENCES

Bullock et al.: J. Am. Chem. Soc., 74, 3455 (July 5, 1952).